United States Patent [19]

Meinecke, Jr.

[11] 3,980,313
[45] Sept. 14, 1976

[54] QUICK-UNLOADING CAMPER UNIT
[75] Inventor: Clarence A. Meinecke, Jr., Jefferson, Iowa
[73] Assignee: Multi-Products, Inc., Gowrie, Iowa
[22] Filed: Feb. 14, 1975
[21] Appl. No.: 549,914

[52] U.S. Cl............................ 280/81 R; 296/23 MC
[51] Int. Cl.².......................................... B62D 21/00
[58] Field of Search............ 280/400, 405 R, 405 B, 280/81 R, 43–43.17, 150 A, 150 F; 180/24.02; 296/23 MC

[56] References Cited
UNITED STATES PATENTS

| | | | |
|---|---|---|---|
| 3,436,096 | 4/1969 | Rogge | 280/34 R |
| 3,532,236 | 10/1970 | Hostetler | 296/23 MC |
| 3,542,414 | 11/1970 | Nelson | 296/23 MC |
| 3,698,758 | 10/1972 | Dodgen | 296/23 MC |
| 3,719,244 | 3/1973 | Miller et al. | 296/23 MC X |

Primary Examiner—M. H. Wood, Jr.
Assistant Examiner—R. Schrecengost
Attorney, Agent, or Firm—Henderson, Strom & Sturm

[57] ABSTRACT

A frame for receiving and holding a camper cabin. A front member is permanently affixed to a vehicle for carrying the camper cabin. The frame is removably insertable into the front member. A support structure having a bumper and jacks mounted on the bumper is affixed to the frame opposite the end insertable into the front member. An axle assembly is affixed to the frame adjacent the support structure.

4 Claims, 7 Drawing Figures

U.S. Patent  Sept. 14, 1976  Sheet 1 of 2  3,980,313
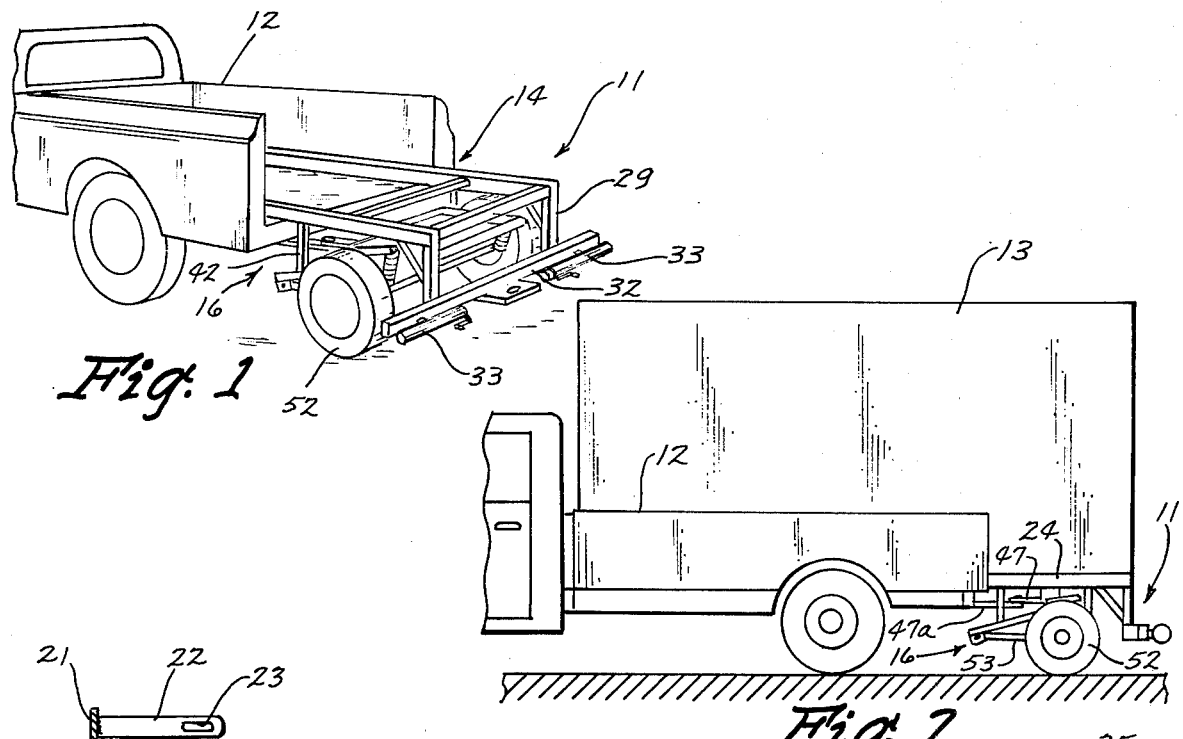
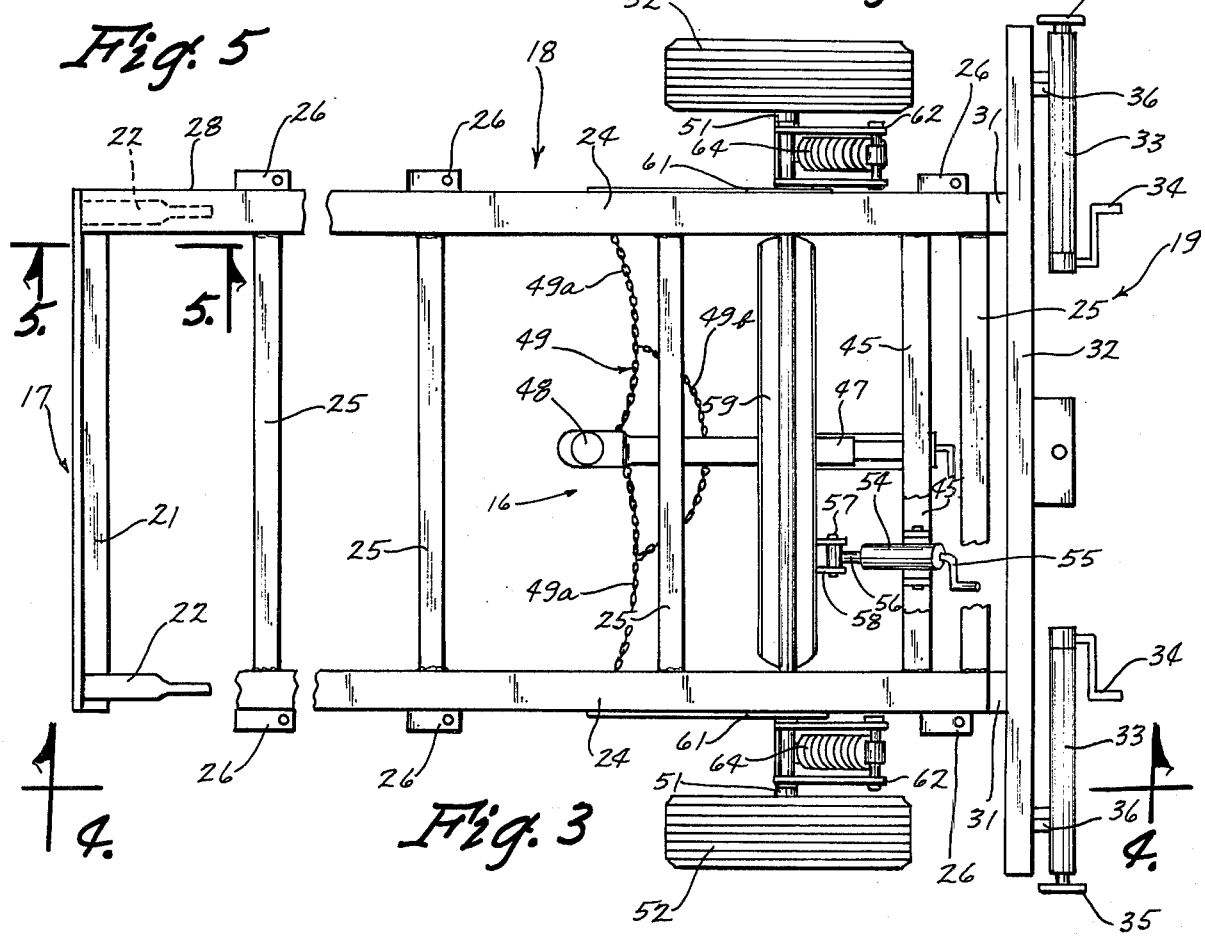

3,980,313

QUICK-UNLOADING CAMPER UNIT

BACKGROUND OF THE INVENTION

The device of this invention relates to attachments for campers. More specifically, the device of this invention relates to campers which are comprised of cabins carried by a vehicle such as a pick-up truck and are detachable from the truck, rather than campers which are self-propelled or which are movable cabins hitched to and towed behind the vehicle.

Present camper cabins which are detachable from a truck can be lived in only when actually mounted upon the truck. When unloaded from the truck, the camper cabin is normally supported by three jacks. The instability of the support structure results in the camper cabin being uninhabitable. Furthermore, the removal of such cabins from the truck is a hard and time consuming task. Another irritation for a user of present campers is, that if he must use his vehicle to transport himself somewhere, he will lose his camping space since the camper cabin cannot be lived in apart from the vehicle and therefore cannot be used to preserve the space.

SUMMARY OF THE INVENTION

According to this invention, a camper apparatus is provided for attachment to camper cabins which are mounted on vehicles such as pick-up trucks.

A front member is affixed to the bed of the vehicle. A frame, which receives and holds the camper cabin, at one end slides into the front member. At the other end of the frame a support structure is affixed. A bumper is affixed to the support structure, and jacks are mounted upon the bumper. An axle assembly is affixed to the frame adjacent the support structure and is detachably affixed to a hitch or the like projecting from the chassis of the vehicle.

When the camper cabin is to be removed from the vehicle, the jacks mounted on the bumper are made to engage the ground; the axle assembly is disengaged from the ground and detached from the vehicle; and the vehicle is driven out from underneath the camper cabin. Portable jacks are provided to support the end of the frame which is normally inserted into the front member.

It is an object of this invention to provide a novel and improved apparatus for attachment to camper cabins.

It is a further object of this invention to provide an apparatus for attachment to camper cabins which will render them swiftly and easily removable from the transporting vehicle.

Still another object of this invention is to provide an apparatus for attachment to camper cabins which will provide such support that the camper cabins will be inhabitable when not mounted on the transporting vehicle.

Another object of this invention is to provide an apparatus which is economical of manufacture, rugged of structure, effective in service and capable of attaining the objects listed hereinbefore.

These objects and other features and advantages of this invention will become readily apparent by reference to the following description when taken in conjunction with the accompanying drawings.

BRIEF DESCRIPTION OF THE DRAWINGS

The appended drawings illustrate the invention, wherein:

FIG. 1 is a perspective view of the camper apparatus of this invention in attachment with a vehicle but without a camper cabin mounted thereon;

FIG. 2 is a side elevational view of the camper apparatus of this invention in attachment with a vehicle and having a camper cabin mounted thereon;

FIG. 3 is an enlarged, foreshortened top plan view of the camper apparatus partially cut away to show certain members with greater clarity;

FIG. 5 is a side elevational view taken along line 5—5 of FIG. 3 illustrating the tapered guide of the front member of the camper apparatus;

DESCRIPTION OF THE PREFERRED EMBODIMENT

Figure 4:
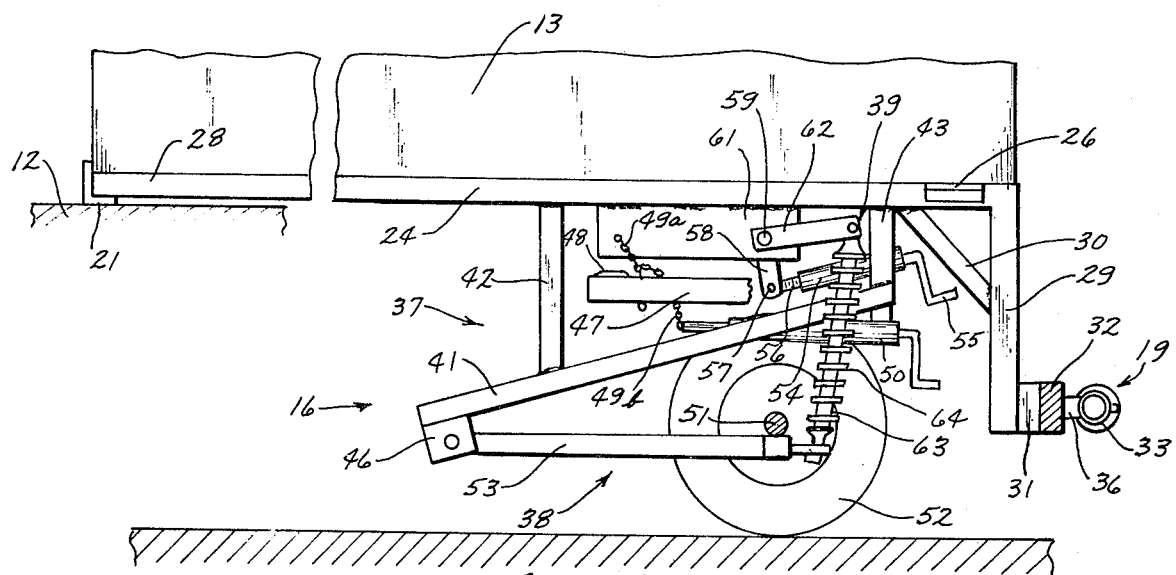
FIG. 4 is a foreshortened side elevational view of the camper apparatus taken along line 4—4 of FIG. 3.

Referring now to the drawings, the camper apparatus of this invention is indicated generally at 11 in FIGS. 1 and 2 in attachment with a vehicle 12, herein depicted as a conventional pick-up truck. A camper cabin 13 is depicted in FIG. 2 attached to and mounted upon the vehicle 12 together with the camper apparatus 11.

The camper apparatus 11 more particularly includes a quick-unloader unit 14 and an axle assembly unit 16 (FIG. 1). Still more particularly, the quick-unloader unit 14 includes a front member 17, a main frame member 18 and a rear support structure 19 (FIG. 3), and the axle assembly unit 16 includes a frame 37 (FIG. 4), an axle structure 38 and an adjustment structure 39.

The front member 17 (FIG. 3) of the quick-unloader unit 14 includes an elongated member 21, herein depicted as an angle iron, with tapered guides 22 welded thereon perpendicular to and at opposite ends of the member 21. The guides 22 have at their tapered portions slots 23 formed therein for conserving weight. The front member 17 is affixed to the bed of the vehicle 12 by bolts passed through member 21.

The main frame member 18 (FIG. 3) includes two parallel elongated side members 24 joined together by transverse members 25. Brackets 26 are affixed along the length of both side members 24. Each bracket 26 attached to one side member 24 is located directly across from a similar bracket 26 attached to the other side member 24 such that three laterally spaced pairs of brackets 26 are formed. The brackets 26 are directed outwardly from the space enclosed by the frame member 18.

Portable first jack members 27 (FIG. 6) are stored within the camper cabin 13 or upon the vehicle 12 when not in use, and in use are made to engage and support the frame member 18 above the ground when the camper apparatus 11 is supporting the camper cabin 13 apart from the vehicle 12. The jacks 27 engage the side members 24 at one end 28 which is opposite the end proximate the rear support structure 19. When the jacks 27 are stored in the camper cabin 13 or vehicle 12 and the camper cabin 13 is being carried by the vehicle 12, the side members 24 at ends 28 slide over and are received by the guide members 22 of the front member 17 (FIGS. 3 and 4).

The rear support structure 19 (FIGS. 3 and 4) of the quick-unloader unit 14 includes a pair of transversely spaced members 29 each of which is affixed in an upstanding manner to one of the side members 24 at the rear end thereof opposite end 28 and each of which extends downwardly from the members 24. Bracing members 30 are affixed between and at a 45° angle to the side members 24 and members 29. The lower ends of the members 29 have projections 31 formed normal thereto and extended away from the axle assembly unit 16. A transverse bumper 32 is affixed to and extended between the projections 31 (FIG. 1).

Second jack members 33 (FIG. 3) having a crank 34 and a piston 35 with a flat support for engaging the ground are carried upon the bumper 32. A receptacle member 36 projecting from each jack 33 fits over a corresponding projection (not shown) extending from the bumper 32. Both the receptacles 36 and projections (not shown) are square in cross section so that the jacks 33 are held either in a horizontally disposed position (FIGS. 3 and 4) or in a vertically disposed position (FIG. 6) when attached to the bumper 32.

The frame 37 (FIG. 4) of the axle assembly unit 16 includes a pair of parallel main members 41 extended longitudinally of the frame 37 and directly under the side members 24. Each of a pair of brace members 42 are attached to one of the side members 24 at a point below the support structure 19. Each of another pair of brace members 43 are also affixed to one of the side members 24 at a point proximate to the support structure 19 (FIG. 4).

The main members 41 are thereby supported directly below and in angular relation to the side members 24 as best illustrated in FIG. 4.

Figure 7:
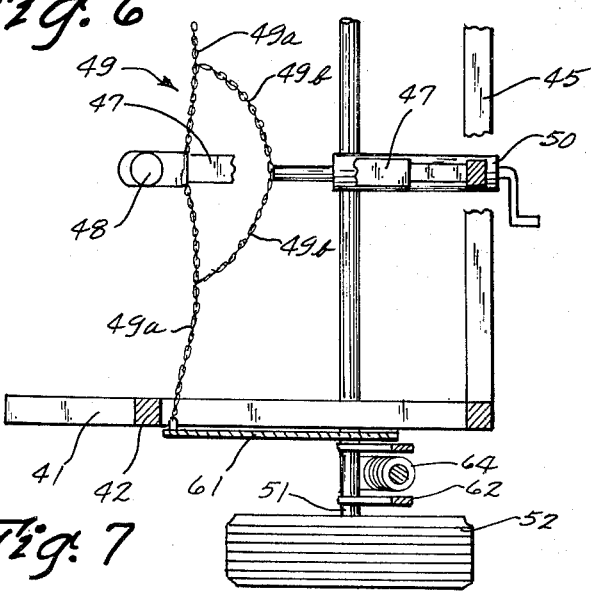
FIG. 7 is a fragmentary plan view of portions of the apparatus, with certain elements broken away for clarity.

Upper and lower transverse members 45 are affixed between the brace members 43. A portion of each main member 41 extends forwardly and beyond the brace members 42 and terminates in a depending plate 46 (FIG. 4). A telescoping tongue member 47 is pivotally attached intermediate the ends of the lower transverse member 45. The free forward end of the tongue 47 is cupped at 48 (FIG. 3) to receive a conventional hitch member 47a (FIG. 2) of the vehicle 12. A chain member 49 (FIG. 7) includes a first chain 49a and a second chain 49b. The first chain 49a is affixed at each end to a plate 61 which is a part of the adjustment structure 39 and is affixed intermediate its ends to the underside of the tongue 47 proximate to the cupped-free forward end 48.

The second chain 49b (FIG. 7) is affixed at each end to the first chain 49a at points on opposite sides of the tongue 47. The second chain 49b is affixed intermediate its ends to a piston extending from the free swinging end of a jack 50. The opposite end of the jack 50 is pivotally attached to the underside of the tongue 47 proximate the point where the tongue 47 is pivotally attached to the lower transverse member 45.

The axle structure 38 (FIGS. 3 and 4) of the axle assembly unit 16 includes an axle 51 having wheels 52 mounted thereon. The wheels 52 may have conventional braking mechanisms (not shown) affixed thereto. Elongated pivot arms 53 extend from the axle 51 to each of the depending plates 46 and are pivotally attached thereto.

The adjustment structure 39 (FIGS. 3 and 4) includes a jack member 54 pivotally attached to the lower transverse member 45 adjacent the tongue 47. A crank 55 for hand actuation extends from the end of the jack 54 proximate its point of attachment to the lower transverse member 45, and a piston 56 extends from the opposite end of the jack 54 and pivotally attaches to a linkage member 57. The linkage 57 is affixed to one end of a pivot arm 58, the other end of which is affixed to a ribbed shaft 59. The shaft 59 is rotatably received by and extends through plates 61 having a sleeve or brushing formed thereon for receiving the shaft 59. The plates 61 are affixed to each of the side members 24 by conventional means such as weldments. The plates 61 also receive the ends of the first chains 49a.

Radius arms 62 (FIG. 3) are affixed to portions of the shaft 59 which extend beyond and are adjacent to the plates 61. A motion dampener 63 such as a conventional hydraulic telescoping shock absorber of the overload type is affixed between the free end of each radius arm 62 and the axle 51. Coil springs 64 embrace each dampener 63 between the axle 51 and each radius arm 62.

Figure 6:
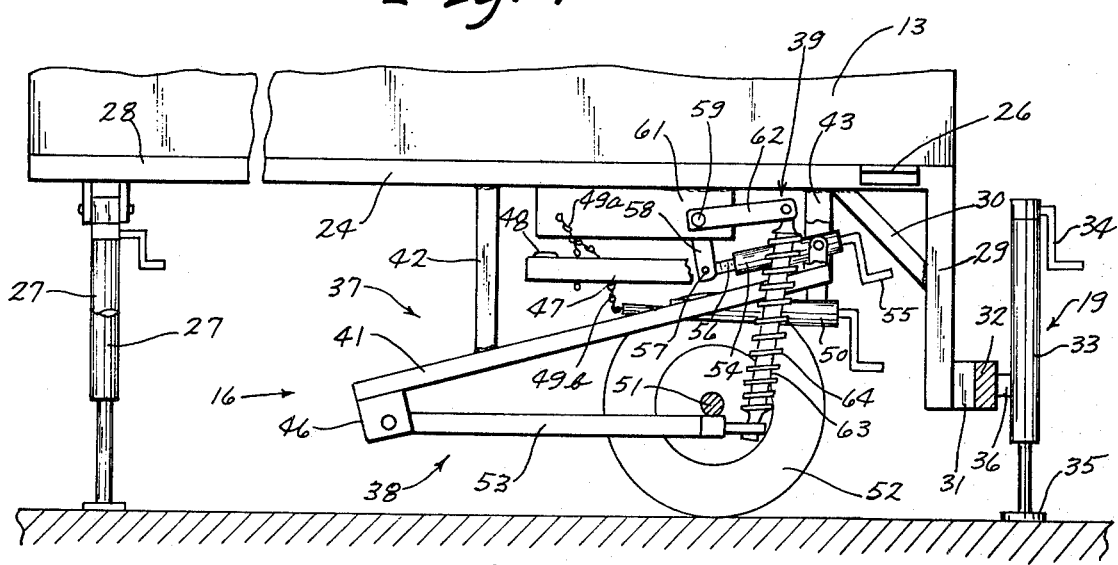
FIG. 6 is a foreshortened side elevational view depicting the camper apparatus of this invention when it is set up to support a camper cabin apart from a vehicle.

When the camper apparatus 11 is in operation, the camper cabin 13 is affixed by bolts to the brackets 26 (FIG. 3) along the side members 24 of the main frame 18. When the camper cabin 13 is being used apart from the vehicle 12, as depicted in FIG. 6, the portable jacks 27 are positioned to support the camper apparatus 11 with cabin 13 at the forward ends 28 of the side members 24, and the rear jacks 33 are moved to their vertically disposed positions upon the bumper 32. Hand actuation of the cranks 34 of the jacks 33 results in the extension of the piston 35 and the engagement of the flat support of the piston 35 with the ground. The wheels 52 of the axle assembly 16 are lifted from engagement with the ground. The jacks 27 and 33 are an arrangement then which provides for a support of greater stability than the conventional three-jack arrangement.

When the cabin 13 and camper apparatus 11 assembly is to be transported by a vehicle 12, the vehicle 12 is backed up to the camper apparatus 11 until the side members 24 are over the bed of the vehicle 12. The jacks 27 are then taken down, and the vehicle 12 is backed up until the side members 24 have telescoped onto the guides 22 of the front member 17. The taper of the guides 22 aids in properly aligning the camper cabin 13 and camper apparatus 11 assembly upon the bed of the vehicle 12.

Once the main frame 18 is secured in the front member 17, the wheels 52 of the axle assembly unit 16 are brought into engagement with the ground. Hand actuation of the crank 55 of the jack 54 results in an extension of the piston 56 of the jack 54. The piston 56 pushes the linkage; the linkage 57 turns the pivot arm 58; and the pivot arm 58 rotates the ribbed shaft 59 within sleeves of the plates 61. The radius arms 62 are rotated downwardly resulting in the lowering of the axle 51 bearing the wheels 52. The elongated arms 53 pivot in the plates 46 as the axle 51 is lowered. The distance which the axle 51 and wheels 52 are lowered depends on how much weight burden the operator desires to transfer from the rear axle of the vehicle 12. The greater the weight of the camper cabin 13 or the extension of the cabin 13 beyond the end of the vehicle 12, the greater the load is which must be carried by the axle assembly 16, and the greater the distance in which the axle 51 and wheels 52 must be lowered.

Once the wheels 52 are in engagement with the ground, the jacks 33 are disengaged from the ground and moved to the horizontally disposed position upon the bumper 32. The tongue member 47 at its cupped portion 48 engages the conventional trailer hitch 47a upon the vehicle 12, and the jack 50 (FIG. 7) is engaged to pull the second chain 49b and therefore the first chain 49a thereby causing the tongue 47 to firmly engage the hitch 47a and to join the camper apparatus 11 to the vehicle 12.

The vehicle 12 may then transport the camper cabin 13. When a desired camping spot is found the process is reversed, and the vehicle 12 is driven out from beneath the camper apparatus 11 and camper cabin 13 assembly.

The loading and unloading of a camper cabin 13 upon a vehicle 12 is thus accomplished quickly and with a minimal amount of effort. The cabin 13 can safely be used apart from the vehicle 12 and can be easily left at a campsite when the vehicle 12 is needed for transport thereby preserving the camping site.

It can therefore be seen that the objects of this invention are fully satisfied by the camper apparatus 11.

Although a preferred embodiment has been disclosed herein, it is to be remembered that various modifications and alternate constructions can be made thereto without departing from the full scope of the invention, as defined in the appended claims.

I claim:

1. For use with camper cabins and vehicles having beds for carrying the camper cabins, a quick-unloading camper device comprising:
    a frame means for receiving and holding the camper cabin;
    a front member affixed to the bed of the vehicle, said frame means at one end being detachably connected to said front member, said frame means resting on the bed of the vehicle when connected to said front member and having a rear end extending beyond the bed of the vehicle at the end opposite said front member; and
    an axle assembly affixed to said frame means adjacent said frame means rear end, said axle assembly including a tongue member pivotally depending therefrom at one end and at the other end being detachably affixed to the vehicle, said tongue member having a jack member and a chain member, said jack member being pivotally attached to said tongue member at one end and affixed to said chain member at the other end, said chain member being affixed between said tongue member and said jack member.

2. A quick-unloading camper device as defined in claim 1 and wherein said chain member includes a first chain and a second chain, said first chain being affixed at each end to said frame means and being affixed intermediate its ends to said tongue member proximate to said tongue member's point of attachment to the vehicle, said second chain being affixed at each end to said first chain and being affixed intermediate its ends to said jack member.

3. A quick-unloading camper device as defined in claim 1 and wherein said frame means includes first jack members detachably affixed thereto at the end of said frame means opposite said rear end thereof whereby the camper cabin is ground supportable when not being carried by the vehicle.

4. A quick-unloading camper device as defined in claim 1 and further wherein a support means is affixed to said frame means rear end, said axle assembly being affixed to said frame means adjacent said support means, said support means including a transversely extended bumper member and second jack members, said second jack members being mounted on opposite ends of said bumper member and being movable between a first horizontally disposed storage position and a second vertically disposed ground supporting position.

* * * * *